Figure 1:
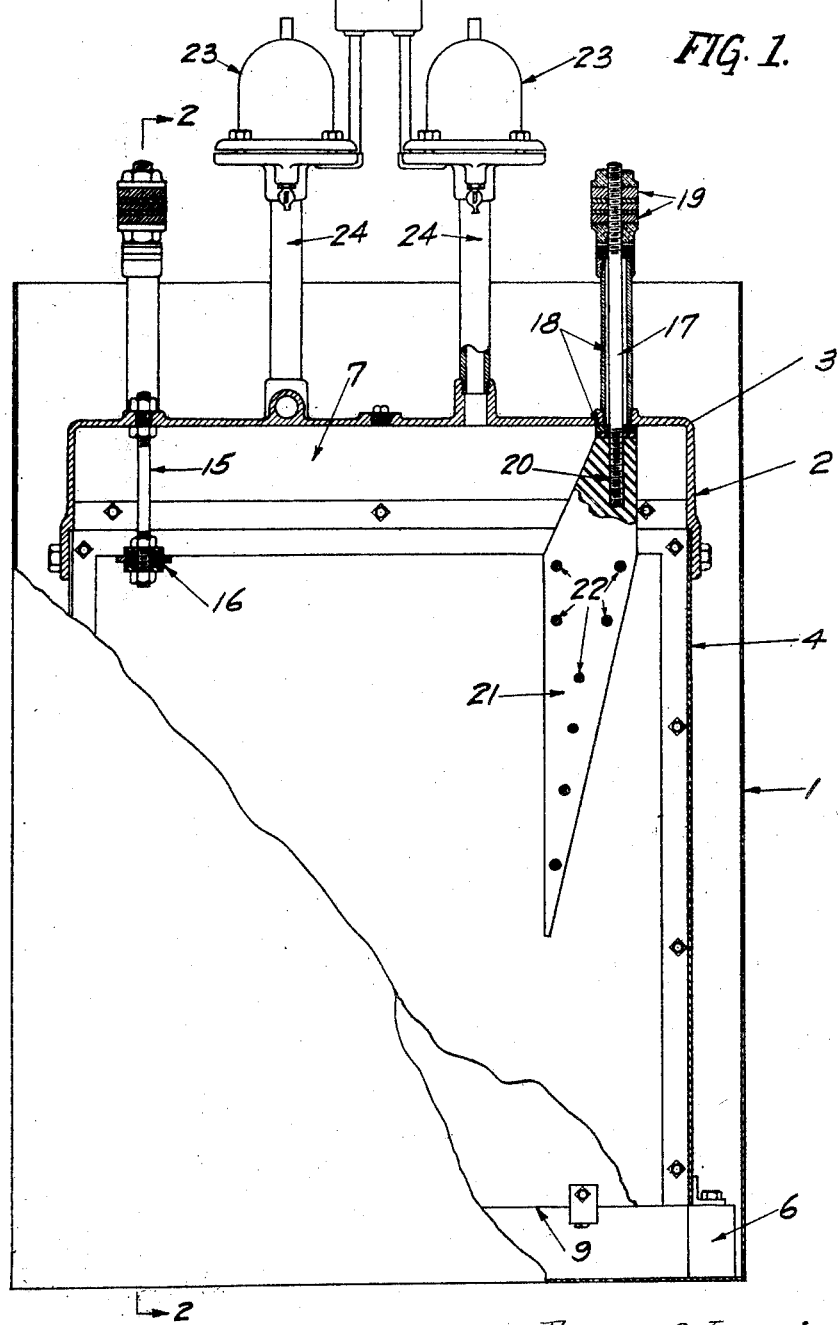

Sept. 29, 1925.  
E. G. LUENING  
1,555,424  
APPARATUS FOR THE PRODUCTION OF HYDROGEN AND OXYGEN  
Filed March 21, 1921  2 Sheets-Sheet 1

Eugene G. Luening,
INVENTOR.
BY
ATTORNEYS.

Sept. 29, 1925. 1,555,424
E. G. LUENING
APPARATUS FOR THE PRODUCTION OF HYDROGEN AND OXYGEN
Filed March 21, 1921 2 Sheets-Sheet 2

Eugene G. Luening,
INVENTOR
By
ATTORNEYS.

Patented Sept. 29, 1925.

1,555,424

UNITED STATES PATENT OFFICE.

EUGENE G. LUENING, OF CHICAGO, ILLINOIS.

APPARATUS FOR THE PRODUCTION OF HYDROGEN AND OXYGEN.

Application filed March 21, 1921. Serial No. 454,109.

*To all whom it may concern:*

Be it known that I, EUGENE G. LUENING, a citizen of the United States, residing at Chicago, in the county of Cook and State of Illinois, have invented certain new and useful Improvements in apparatus for the production of hydrogen and oxygen for the electrolysis of solutions, particularly applicable to electrolytic apparatus for the generation of hydrogen and oxygen by the decomposition of water, of which the following is a description and specification.

This invention relates to apparatus used for the electrolysis of solutions, and particularly to apparatus used for the electrolytic production of hydrogen and oxygen gas by the electrolysis of water. Its object is to secure maximum capacity at a satisfactory efficiency in apparatus of this type, and is applicable to all existing apparatus for the electrolysis of water to a greater or less degree.

In electrolytic apparatus in general, and particularly that used for the decomposition of water for the production of oxygen and hydrogen, the maximum capacity of any unit or cell of the apparatus has heretofore been based on the laws of electrolysis applicable to the use of particular materials for the electrodes, as, for instance, iron. In determining the capacity and efficiency of such apparatus, the resistance of the elements to the free passage of electric current, has been the determining factor, based upon the well known law of electro-chemistry that a specific voltage is required for the decomposition of water. Having determined the required voltage, the economy of a cell is dependent upon a construction which permits gas evolution at a voltage approaching as near as possible to this emperical figure. Thus it may be stated that the efficiency of an electrolytic cell is dependent upon that voltage necessary to produce decomposition of the solution, plus an additional amount above this maximum voltage to overcome the resistance of the various elements and conductors of the apparatus, which includes the resistance offered by the solution itself, the gas film that is present between the solution and the surface of the electrodes, and finally, the resistance in the metallic conductors. The latter resistance, however, is ordinarily disregarded upon the assumption that conductors will be provided which will carry the necessary current without loss. In the development of electrolytic apparatus, the introduction of materials other than iron for the electrodes was found to be advantageous as a method for reducing the oxidation of such material. Thus it became the universal practice to cover the surface of the anodes in contact with the solution with nickel, or metals of like properties, as a protective coating. It was recognized in the design and construction of electrolytic cells in which iron alone was used as the electrode material, that the capacity of such cells as distinguished from the efficiency thereof, was dependent upon the current density; that is, the number of amperes of current per square inch of active electrode surface; that is, surface in contact with the solution. To state it in a different way, the capacity of a cell, which as just mentioned, is dependent on the current density, has direct bearing upon the gas production thereof, but at the same time is distinct from the efficiency of the same cell, this latter term being ordinarily expressed as the ratio of the cubic feet of oxygen produced for every kilowatt-hour of electric current consumed. The standard efficiency at the present time is approximately 3.65 cubic feet of oxygen and 7.30 cubic feet of hydrogen per kilowatt-hour, and furthermore, to maintain this efficiency, it has been determined that a cell must operate at an approximate voltage of 2.2. Before the utilization of materials other than iron, the limiting quality which determines the capacity, and to some extent the efficiency of a cell, was the point at which the electro-deposition of iron commenced. This figure was commonly accepted as being approximately at a current density of ten square inches per ampere (or one-tenth ampere per square inch).

However, with the use of materials other than iron, it has not been generally recognized that the current density was changed even tho the mass of the electrode remain iron, and the commonly used protective metal was merely a coating applied to the surface of the iron electrode. Furthermore, the change in the electrode material permitting a greater current density, was not recognized as a basis of a different and new principle in determining the efficiency and capacity of electrolytic cells, in spite of the fact that it was well known in electro-chemistry that the electrodeposition of nickel or other metals took place at a different current density than deposition of iron in the same solution.

It is therefore the recognition of this principle and its application to the design of electrolytic cells that is the basis for the departure from the ordinary method of construction for such cells, as will hereinafter be described. The principle above announced and applied to the design and construction of electrolytic cells is primarily based on the heretofore unrecognized fact that in order to obtain maximum economy, and maximum capacity in electrolytic cells, the same must be designed to operate a current density commensurate with the character of the surface of the material of the electrodes, it being evident that a cell cannot be operated at maximum economy or capacity, unless it is designed to carry a current just below that density which involves the electrodeposition of the surface materials of the electrodes. Thus it may be stated that the proper design of an electrolytic cell, from the standpoint of both economy and capacity, is dependent upon the current density at which the electrodeposition of the materials used takes place, and furthermore, that this current density may be confined to that of the anode only, because it is at this point that the current enters the solution and discharges its energy thereto in performing the desired decomposition or electro-chemical phenomena.

It may be therefore stated that the object of my invention is primarily to increase the gas production of an electrolytic cell, regardless of the efficiency at which it is designed to operate, and without decreasing such efficiency or economy of the electrolytic installation.

In order to further bring out the principle already announced and to clearly disclose its application to an electrolytic cell, a preferred construction and design for such cell will now be described, and in connection with the accompanying drawings, in which—

Figure 2:
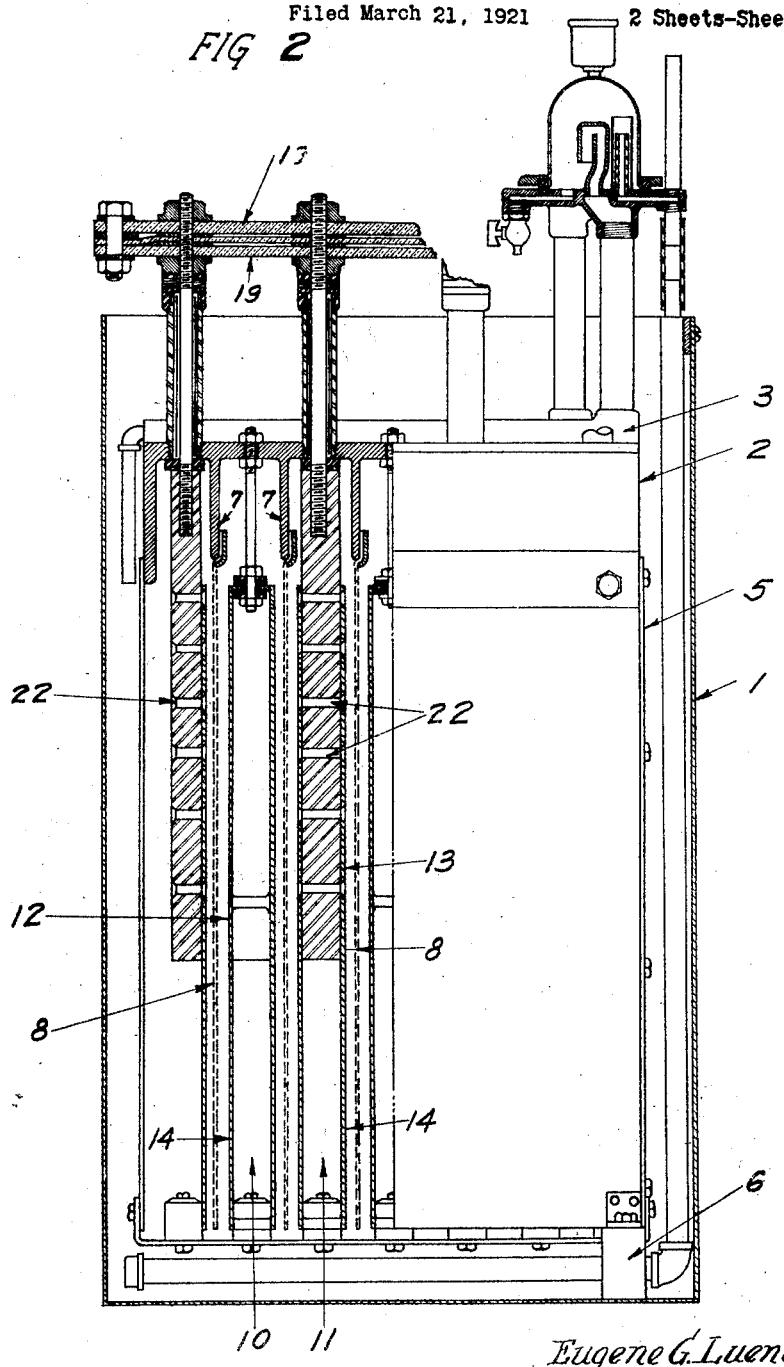

Figure 1 is a section view of an existing mechanism constructed in accordance with the principles disclosed, Figure 2 is an end section view taken on line 2—2 of Figure 1.

A specific example of an apparatus embodying the invention comprises a case 1 containing the cell element 2 consisting of a casting 3 provided with ends 4 and sides 5. The element is suitably supported with its open end downward upon insulator 6. The casting 3 consists of a box-like structure divided into a number of compartments by partitions 7 parallel to each other extending from end to end of the casting. The partitions 7 each carry a diaphragm 8 of asbestos or other suitable material extending to the bottom level 9 of the element 2, whereby a plurality of chambers 10 and 11 are formed constituting cathode and anode compartments of the cell, in which are placed electrodes 12 and 13 of corresponding polarity, each consisting of two rectangular thin metal plates 14—14 spaced apart in parallel relation to each other, thereby forming a passage between them. Each electrode is supported from the casting 3 by two suspension devices; one in each end. The smaller of these, a rod 15, is merely a suspension device insulated from the electrode at 16 (Figure 1). The other suspension device consists of a conductor rod 17 insulated thruout its length and from the casting 3 by the insulating packing 18. It is provided at its top with electrical connections with bus bars 19—19, and has threaded connection at its lower end portion 20 with a contact block 21 of electrical conducting material. This block 21 is attached either by means of rivets 22, or by welding or by other suitable means to the plates 14—14 of each electrode 12 and 13 in such a way that the current for which the cell is designed can be carried without loss to the active surface of the electrode. So far as this type of cell is concerned, the electrodes 12 and 13 are exactly alike except that the cathodes have the conductors 17 at one end while the anodes have them at the opposite end.

In the operation of this cell, the passage of the electric current from one electrode; namely, the anode 12, to the adjacent electrode, or cathode 13, thru the intervening diaphragm 8, decomposes the water surrounding the electrodes into hydrogen and oxygen as previously explained. Gas bubbles form on the outside surface of the plates 14 and rise to the surface of the water and are collected in the chambers at the upper portions of the case 2, and from thence conducted to the gas reservoirs 23—23 communicating with the chambers thru pipes 24—24.

The structure herein described may be said to be typical of an electrolytic cell, so far as the general arrangement and disposition of the elements is concerned. The new and heretofore unrecognized principle of electrolytic cell design, however, is based on the relative current carrying capacity of the conductors leading to the electrodes, and the current density of the electrodes themselves. The current carrying capacity of the conductors, and this refers to the bus bars 19, the conductors 17, and finally the blocks 21, is determined to be that which will permit the free passage of current to the electrode with negligible electrical loss and rise in temperature, and in an amount such that the current density at the electrode is slightly less than the current density necessary for the electrode deposition of the particular electrode material used in the particular solution used.

Therefore, in computing the data upon which the size of the conductors is based there must be taken into consideration the electrode area; that is, the active surface thereof, and the metal to be used in the conductors. Knowing the current density necessary for the electrodeposition of the electrode material, the problem resolves itself into providing a conductor which will supply current freely to the electrode at a current density slightly less than that necessary for the electrodeposition of the material. Having thus arrived at the proper dimensions of the conductors to deliver the proper current amperage, it remains a matter of choice as to the shape of the conductor, and particularly that of the blocks 21, which for electrical reasons are preferably elongated longitudinally of the plates 14—14, in order to promote uniform current distribution. The wedge shaped block of Figure 1 is considered a satisfactory shape, for the reason that it offers maximum current carrying capacity with least amount of material, altho the exact shape is of no particular moment in obtaining the desired results.

The particular advantages which follow from the structure herein disclosed, and based on the electro-chemical principle herein announced, is the greatly increased production that may be obtained, regardless of the particular efficiency at which the apparatus operates, or at which it is designed to operate. In other words, without increasing or altering the size or general structure, it is possible to increase the gas production without increasing the cost of operation or sacrificing economy. This fact is of great value in the treatment of electrolytic installations already in existence, whereby by the redesigning of certain elements, to-wit: the electrode conductor, it is possible to double, and even more than double the gas production, without otherwise altering the other factors entering into the operation of a given unit.

What I claim, therefore, in the art of electrolysis, is:

1. In a cell of the class described, an electrode having vertical spaced apart plates, a conductor leading to the top thereof, and an intervening connecting block secured to a plate, the electrode and block being of substantially equal current carrying capacity.

2. In a cell of the class described, an electrode having vertical spaced apart plates, a conductor leading to the top thereof and an intervening connecting block of current capacity about equal to the current capacity of the plates secured on the inside face of a plate.

3. In a cell of the class described, an electrode having vertical spaced apart plates, a current carrying member leading thereto and connecting devices attached to the carrying member and attached to the plates in vertical lines extending below the upper edges of the plates.

4. In a cell of the class described, an electrode having spaced apart side walls, a conductor leading to the upper end thereof and a connecting block of greater vertical than horizontal length attached to the conductor and to an interior wall of the electrode.

5. In a cell of the class described, an electrode having spaced apart side walls, a conductor leading to the upper end thereof and a connecting block of greater vertical than horizontal length, the width of the block being substantially less than the transverse width of the side plates, attached to the conductor and to an interior wall of the electrode.

6. In a device of the class described, a hollow electrode comprising parallel side walls and connecting end parts, open top and bottom for the passage of liquid from top to bottom of the electrode, a large capacity electric conductor entering one end of the electrode from the top and a wedge shaped conductor connector attached to said conductor part, with the base of the wedge at the top of the electrode and its point at the end of the electrode and near the bottom thereof, and means for electrically connecting said wedge block to the interior of the wall of the electrode.

7. In a device of the class described, a hollow electrode comprising parallel side walls and connecting end parts, open top and bottom for the passage of liquid from top to bottom of the electrode, a large capacity electric conductor entering one end of the electrode from the top and a wedge shaped conductor connector attached to said conductor part, with the base of the edge at the top of the electrode and its point at the end of the electrode and near the bottom thereof, and welding means for electrically connecting said wedge block to the interior of the wall of the electrode.

8. As an article of manufacture, an electrode consisting of two parallel separated metal plates of relative large area, spaced apart at their ends there being interposed between said plates at one end of the electrode a downwardly pointed wedge shaped block welded thereto, said wedge being adapted at its upper end for electric connection with a current carrying rod of very substantial capacity.

9. In a cell, an electrode having spaced apart plates, a conductor, and a connecting block electrically connecting the plates and conductor, said block having substantially the current carrying capacity of the entire plates where joined therewith.

10. In a cell, an electrode having spaced apart plates, a conductor, and a connecting block disposed between and engaging the inner faces of the plates and electrically connecting the plates and conductor, said block having substantially the current carrying capacity of the entire plates where joined therewith.

11. In a cell, an electrode having upright spaced apart walls, a conductor, and a connecting block electrically connecting said conductor and walls and having the upright dimension of its place of engagement with said walls in excess of the horizontal dimension of its place of engagement with said walls.

12. In a cell, an electrode having upright spaced apart plates, a conductor, and a connecting block disposed between and engaging the inner faces of the plates, and electrically connecting said conductor and plates and having the upright dimension of its place of engagement with said plates in excess of the horizontal dimension of its place of engagement with said plates.

In witness whereof, I hereunto subscribe my name this 17th day of March, A. D., 1921.

EUGENE G. LUENING.